(12) United States Patent
Mittelstadt

(10) Patent No.: US 10,849,430 B2
(45) Date of Patent: *Dec. 1, 2020

(54) APPARATUS FOR HEAD AND NECK SUPPORT

(71) Applicant: John Mittelstadt, Mill Valley, CA (US)

(72) Inventor: John Mittelstadt, Mill Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,743

(22) Filed: Apr. 29, 2019

(65) Prior Publication Data

US 2019/0246798 A1     Aug. 15, 2019

Related U.S. Application Data

(63) Continuation of application No. 15/433,924, filed on Feb. 15, 2017, now Pat. No. 10,314,402, which is a continuation of application No. 29/587,471, filed on Dec. 13, 2016, now Pat. No. Des. 833,774.

(51) Int. Cl.
    *A47G 9/00*      (2006.01)
    *A47C 7/38*      (2006.01)
    *B60N 2/882*      (2018.01)

(52) U.S. Cl.
    CPC .............. *A47C 7/383* (2013.01); *B60N 2/882* (2018.02)

(58) Field of Classification Search
    CPC ...... B60N 2/882; B60N 2/2821; B60N 2/885; B60N 2/888; B60N 2/806; A47C 7/383
    See application file for complete search history.

(56) References Cited

U.S. PATENT DOCUMENTS

| | | |
|---|---|---|
| 4,345,347 A | 8/1982 | Kantor |
| D277,630 S | 2/1985 | Olson et al. |
| 4,560,201 A | 12/1985 | Scott |
| 4,617,691 A | 10/1986 | Monti et al. |
| 4,753,478 A | 6/1988 | Weinreich |
| 4,796,315 A | 1/1989 | Crew |
| D309,393 S | 7/1990 | Talaugon |
| D358,957 S | 6/1995 | Propp |
| D390,405 S | 2/1998 | Jung |
| D396,594 S | 8/1998 | Lefebvre |
| 5,974,607 A | 11/1999 | Smith |
| 6,017,094 A | 1/2000 | Syiek |
| 6,434,770 B2 | 8/2002 | Matthews Brown |
| D482,558 S | 11/2003 | Kancilja et al. |
| 6,748,615 B1 | 6/2004 | Tiedemann |
| D492,874 S | 7/2004 | Fux et al. |
| 6,859,965 B1 | 3/2005 | Gourd |

(Continued)

FOREIGN PATENT DOCUMENTS

| | | |
|---|---|---|
| AU | 7646691 A | 11/1991 |
| AU | 2003201842 A1 | 10/2003 |

(Continued)

*Primary Examiner* — Shin H Kim
(74) *Attorney, Agent, or Firm* — Mintz Levin Cohn Ferris Glovsky and Popeo, P.C.

(57) ABSTRACT

An apparatus may include a support element and a securing element. The securing element may be coupled to the support element. Furthermore, the securing element may be configured to maintain the support element in a position that enables the supporting element to provide support for a head, a neck, and/or an upper spine of a user.

20 Claims, 7 Drawing Sheets

(56) References Cited

U.S. PATENT DOCUMENTS

| | | |
|---|---|---|
| D503,580 S | 4/2005 | Donoghue |
| D507,920 S | 8/2005 | Mack |
| 6,957,462 B1 | 10/2005 | Wilcox |
| 6,973,691 B1 | 12/2005 | Cordova et al. |
| D534,389 S | 1/2007 | Chisholm et al. |
| D542,071 S | 5/2007 | Chan |
| 7,322,061 B2 | 1/2008 | Carroll |
| D595,526 S | 7/2009 | Mills et al. |
| D597,364 S | 8/2009 | Lindgren |
| D608,128 S | 1/2010 | Campbell |
| D612,654 S | 3/2010 | Eura et al. |
| D613,987 S | 4/2010 | Heeter |
| D614,901 S | 5/2010 | Welch |
| D615,794 S | 5/2010 | Jorgensen et al. |
| 7,722,122 B2 | 5/2010 | Mittelstadt |
| D618,947 S | 7/2010 | Kalatsky |
| D628,845 S | 12/2010 | Guner et al. |
| 7,909,406 B2 | 3/2011 | Samuelsen |
| D637,439 S | 5/2011 | Mettler |
| D640,493 S | 6/2011 | Nishijima et al. |
| D653,488 S | 2/2012 | Thomason |
| D686,025 S | 7/2013 | Blazure |
| 8,555,429 B2 | 10/2013 | Leach |
| D699,017 S | 2/2014 | Sunvold et al. |
| 8,708,416 B2 | 4/2014 | Stronconi |
| D704,963 S | 5/2014 | McNeil et al. |
| D706,553 S | 6/2014 | Webster et al. |
| D709,303 S | 7/2014 | Velasco |
| D714,574 S | 10/2014 | Levy |
| D733,462 S | 7/2015 | Pellegrini |
| D737,073 S | 8/2015 | Hawkins |
| D738,136 S | 9/2015 | Goldblatt |
| D738,645 S | 9/2015 | Goetsch |
| D746,080 S | 12/2015 | Mittelstadt |
| D747,899 S | 1/2016 | Klein |
| D750,929 S | 3/2016 | Line et al. |
| D752,902 S | 4/2016 | Peraza et al. |
| D753,415 S | 4/2016 | Atawane |
| 9,408,471 B2 | 8/2016 | Higa |
| D766,015 S | 9/2016 | Walker |
| D768,410 S | 10/2016 | Jennings |
| D769,027 S | 10/2016 | Wang |
| D789,118 S | 6/2017 | Kim |
| D804,849 S | 12/2017 | Stern |
| D804,852 S | 12/2017 | Glaze |
| D815,859 S | 4/2018 | Jewell |
| D833,774 S | 11/2018 | Mittelstadt |
| 10,314,402 B2 * | 6/2019 | Mittelstadt ............ A47C 7/383 |
| 2004/0026979 A1 | 2/2004 | Haddon |
| 2005/0015881 A1 | 1/2005 | Littlehorn |
| 2005/0173961 A1 | 8/2005 | Morphew et al. |
| 2005/0173962 A1 | 8/2005 | Stein et al. |
| 2006/0244299 A1 | 11/2006 | Snedeker |
| 2006/0267392 A1 | 11/2006 | Charnitski |
| 2010/0117435 A1 | 5/2010 | Samuelsen |
| 2012/0313417 A1 | 12/2012 | Hurwitz |
| 2013/0076003 A1 | 3/2013 | Lanci et al. |
| 2013/0117939 A1 | 5/2013 | Moss |
| 2013/0119716 A1 | 5/2013 | Stronconi |
| 2013/0318722 A1 | 12/2013 | Kim et al. |
| 2015/0257538 A1 | 9/2015 | MacDougall et al. |
| 2016/0101716 A1 | 4/2016 | Brecht et al. |
| 2017/0232874 A1 | 8/2017 | Blankenship |
| 2018/0009346 A1 | 1/2018 | Ugran |

FOREIGN PATENT DOCUMENTS

| | | |
|---|---|---|
| AU | 2013206536 A1 | 10/2013 |
| DE | 202013012441 U1 | 11/2016 |
| KR | 102005115660 A | 12/2005 |
| WO | WO-2009/009696 A1 | 1/2009 |

* cited by examiner

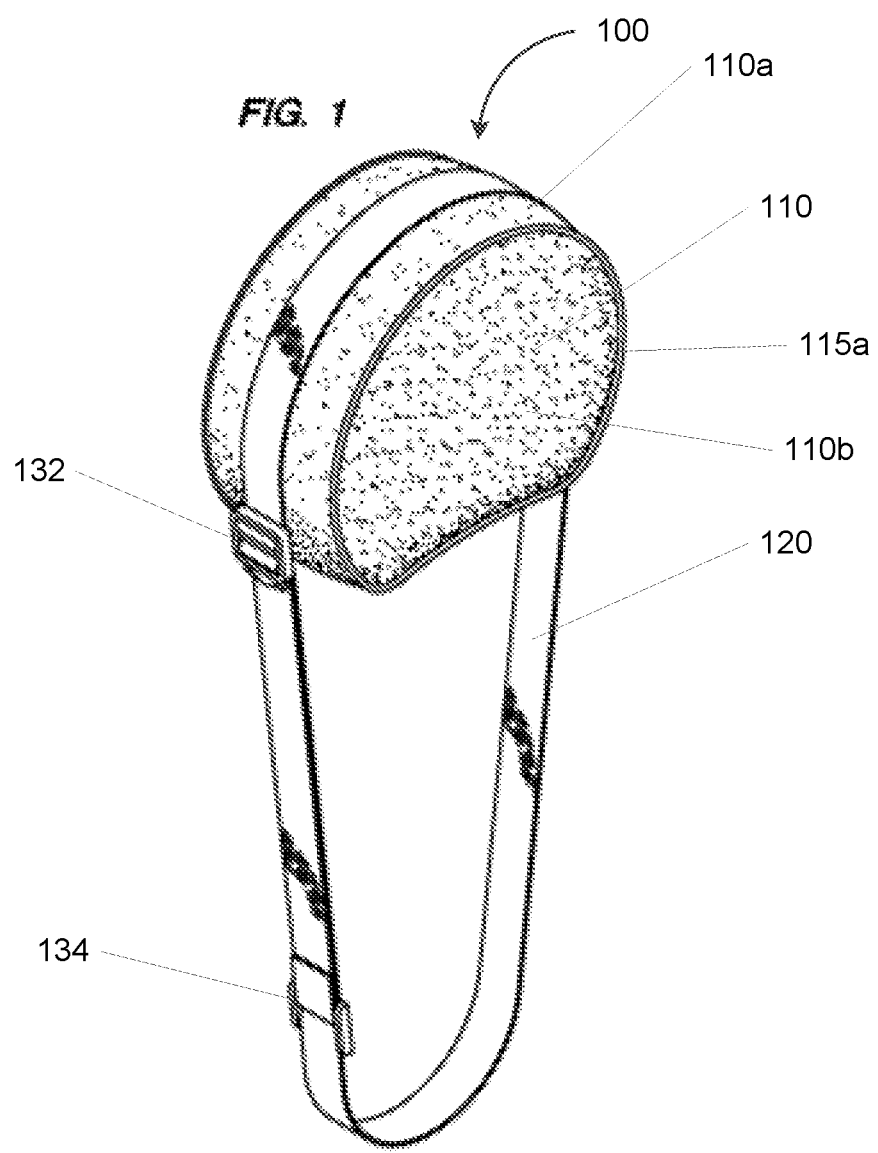

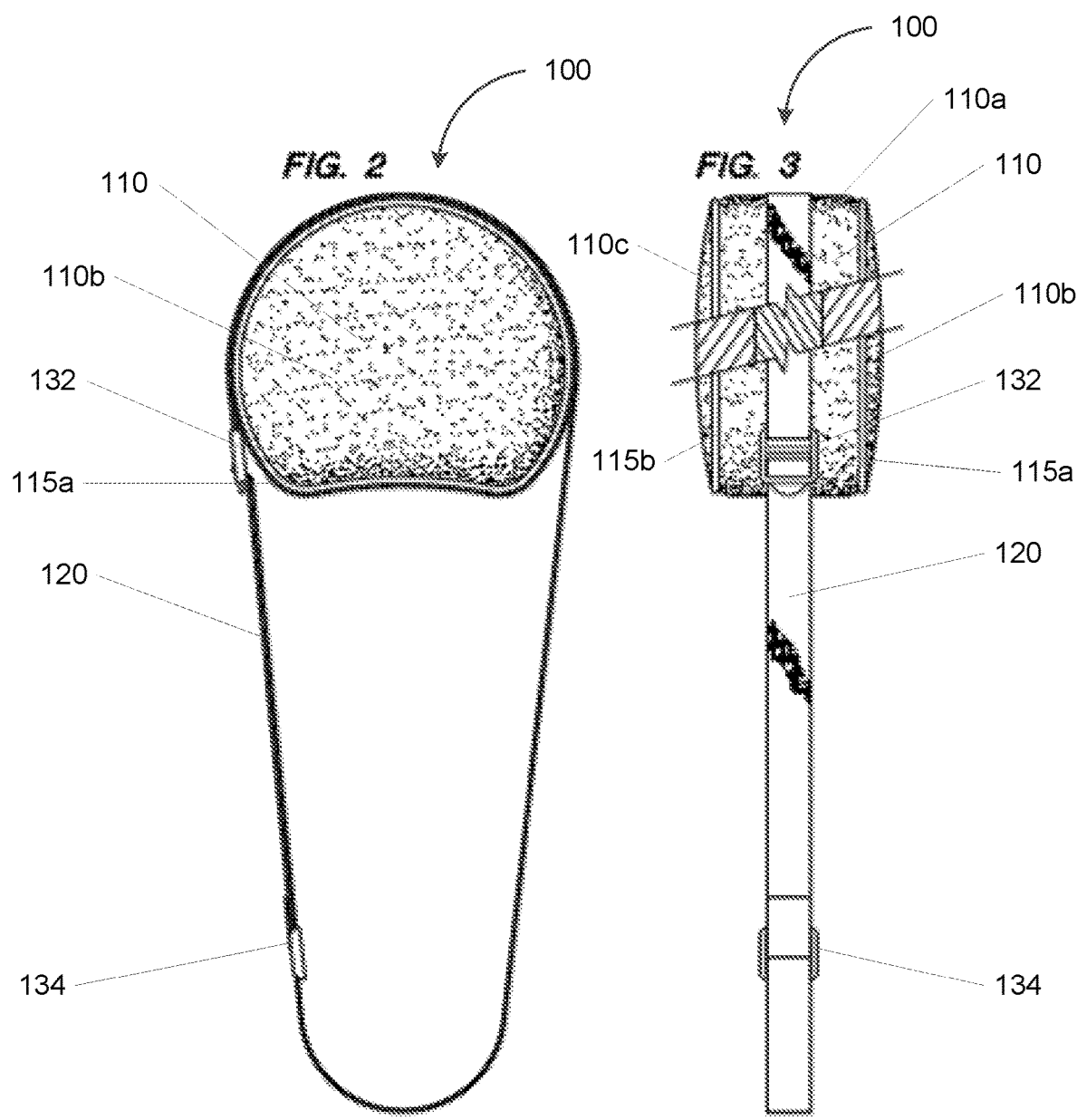

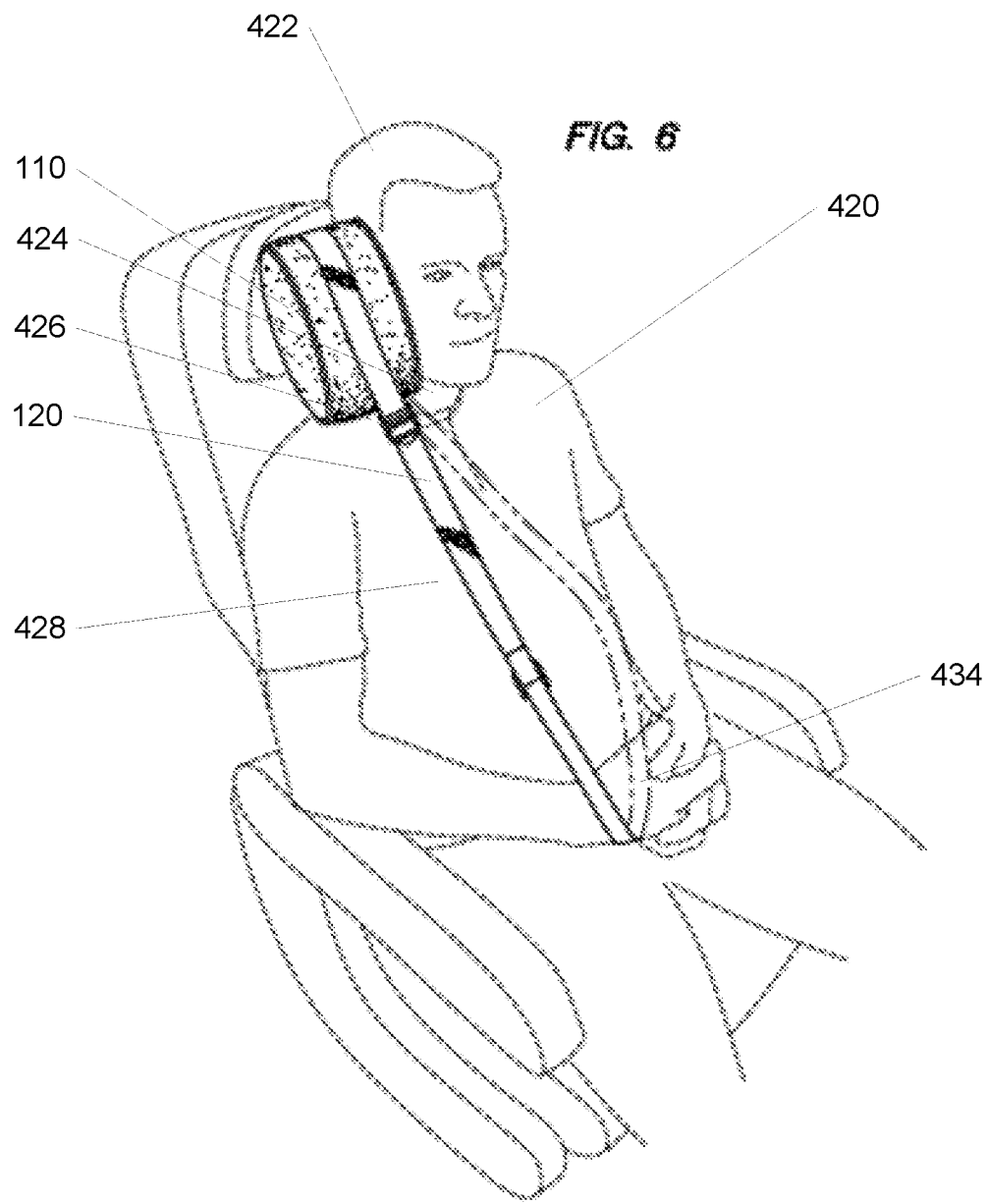

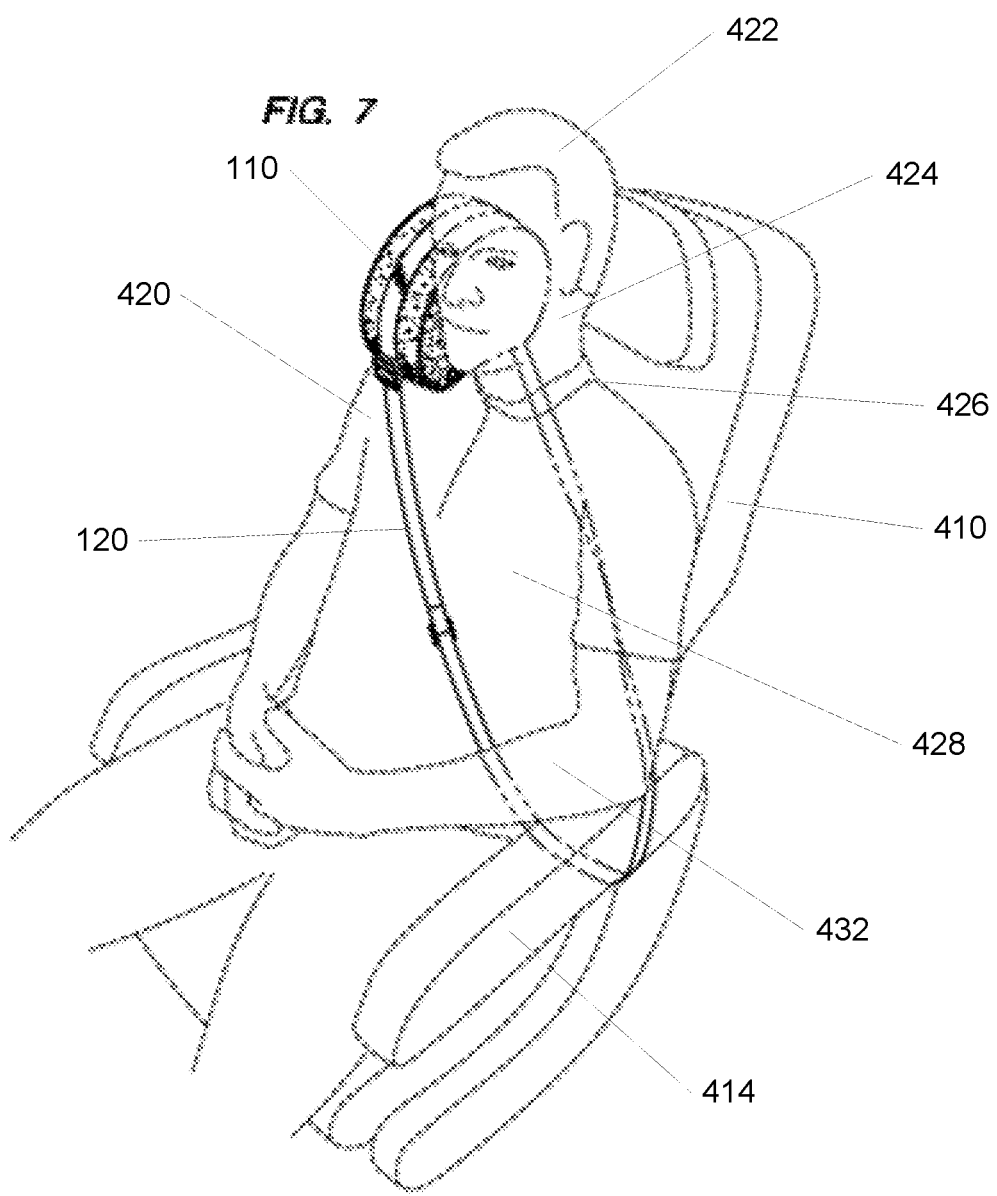

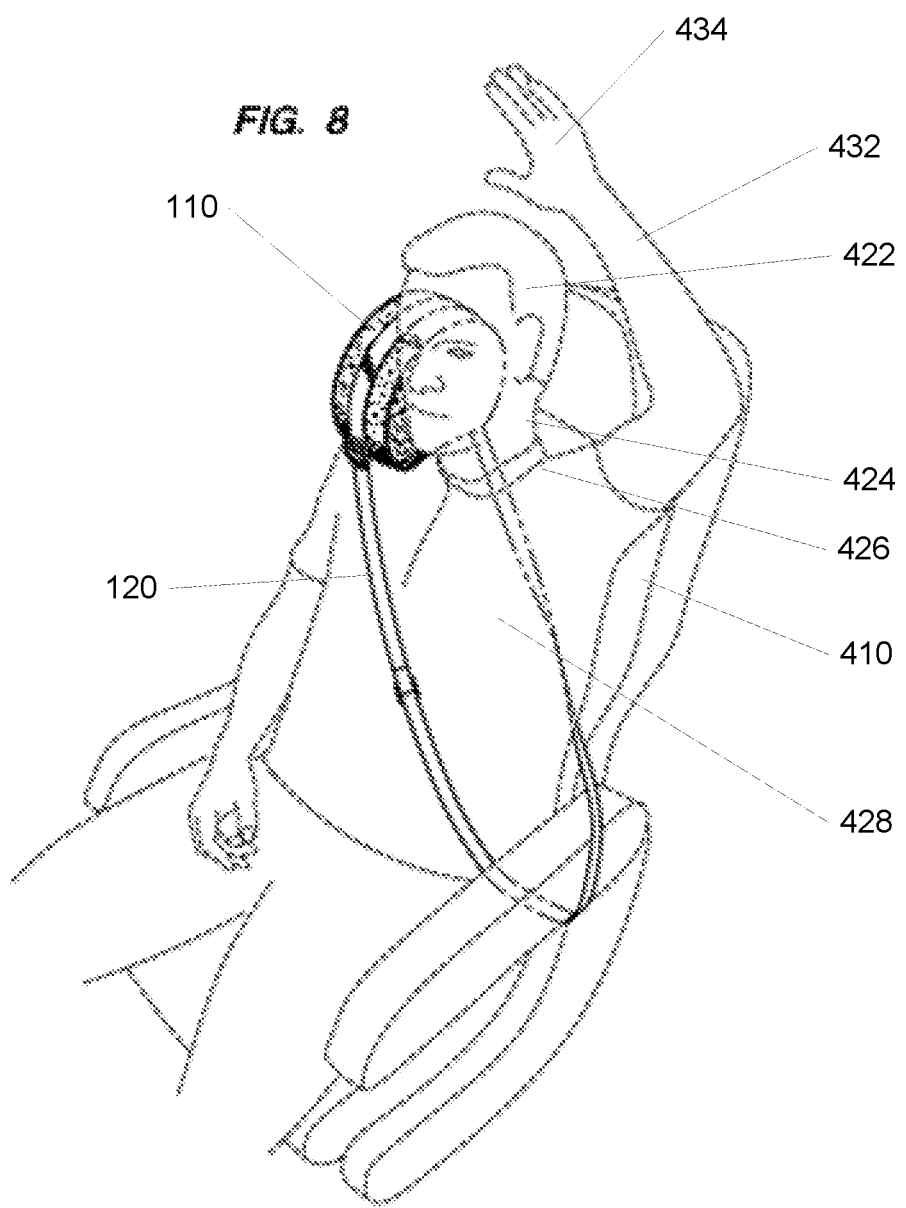

APPARATUS FOR HEAD AND NECK SUPPORT

RELATED APPLICATION

This application is a continuation application of U.S. patent application Ser. No. 15/433,924 filed Feb. 15, 2017, entitled "APPARATUS FOR HEAD AND NECK SUPPORT," which claims priority to U.S. Design Patent Application Ser. No. 29/587,471 filed Dec. 13, 2016, entitled "HEADREST PILLOW," the disclosures of these are incorporated herein by reference in its entirety.

TECHNICAL FIELD

This invention relates to an apparatus providing support for the head, neck and/or the upper spine, and more specifically to a self-securing and stabilizing headrest pillow.

BACKGROUND

Many modes of transportation (e.g., airplanes, cars, buses, trains, boats) often require travelers to sit upright in a confined space over an extended period time. In particular, travelers may be forced to sustain this upright posture with minimal support for the head, neck, and/or upper spine. Conventional travel pillows are typically portable versions of bed pillows better suited for a supine position. As such, conventional travel pillows do not provide adequate support for the head, neck and/or upper spine of a traveler sitting in an upright position. This lack of head, neck, and upper spine support may compromise the traveler's comfort, health, and safety.

SUMMARY

Articles of manufacture, including apparatuses, and methods for using the articles of manufacture are provided. In some example embodiments, there is provided an apparatus that includes a support element and a securing element. The securing element may be coupled to the support element. The securing element may be further configured to be secured to an anchoring object. The securing of the securing element to the anchoring object may maintain the support element in a position that enables the support element to provide support for a head, a neck, and/or an upper spine of a user.

In some variations, one or more features disclosed herein including the following features can optionally be included in any feasible combination. The securing element may be a strap. The strap may include a buckle and/or a loop that enables an adjustment of a length of the strap.

In some variations, the support element may be a cushion that includes foam, a natural filler, and/or a synthetic filler. Alternately and/or additionally, the support element may be an inflatable cushion.

In some variations, the securing element may be secured to the anchoring object to at least provide a counterbalance to a weight of the head, the neck, and/or the upper spine of the user against the support element. The securing element may be secured to the anchoring object on an opposite side of the user as the support element. Alternately and/or additionally, the securing element may be secured to the anchoring object on a same side of the user as the support element. The anchoring object may be at least a portion of the user. The anchoring object may be a hand and/or an arm of the user. The anchoring object may be at least a portion of a seat. The anchoring object may be a headrest and/or an armrest of the seat.

In some variations, the securing element may be coupled to the support element via a detachable and/or a non-detachable coupling.

In some example embodiments, there is provided a method. The method may include securing, to an anchoring object, a securing element. The securing element may be coupled to a support element. The securing of the securing element to the anchoring object may maintain the support element in a position that enables the support element to provide support for a head, a neck, and/or an upper spine of a user.

In some variations, the anchoring object may be at least a portion of the user. Alternately and/or additionally, the anchoring object may be at least a portion of a seat.

In some variations, the securing of the securing element may include looping the securing element around a torso of the user. The securing element may be looped around the torso of the user to at least enable the securing element to be secured to the anchoring object on a same and/or an opposite side of the user as the cushion element.

In some variations, the securing element may be secured to the anchoring object to at least provide a counterbalance to a weight of the head, the neck, and/or the upper spine of the user against the support element.

In some example embodiments, there is provided an apparatus that includes a cushion and a strap. The strap maybe coupled to the cushion. The strap may be configured to be secured to an anchoring object. The securing of the strap to the anchoring object may maintain the cushion in a position that enables the cushion to provide support for a head, a neck, and/or an upper spine of a user.

Implementations of the current subject matter can include, but are not limited to, apparatuses consistent with the descriptions provided herein. The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 1 depicts a perspective view of a headrest pillow, in accordance with some example embodiments;

FIG. 2 depicts a front view of a headrest pillow, in accordance with some example embodiments;

FIG. 3 depicts a side view of a headrest pillow, in accordance with some example embodiments;

FIG. 5 depicts an example use of a headrest pillow, in accordance with some example embodiments;

FIG. 7 depicts an example use of a headrest pillow, in accordance with some example embodiments; and FIG. 8 depicts an example use of a headrest pillow, in accordance with some example embodiments.

DETAILED DESCRIPTION

Figure 4:
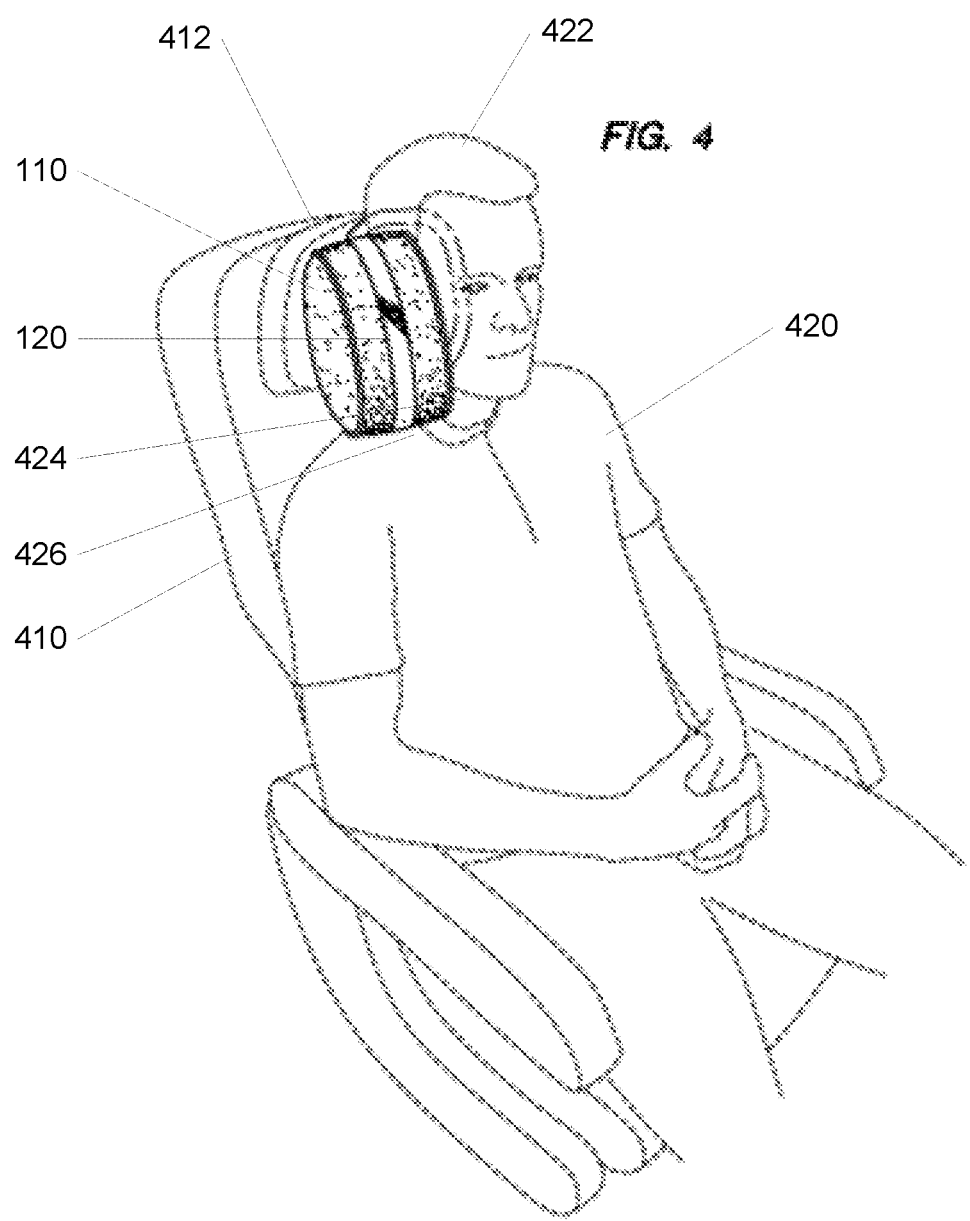
FIG. 4 depicts an example use of a headrest pillow, in accordance with some example embodiments.

While a user is sitting in an upright position, it may be especially difficult to maintain a headrest pillow in a position where the headrest pillow is able to provide adequate head, neck, cervical, and upper spine support. In particular, a conventional headrest pillow may be unable to prevent the user's head from hanging and/or tilting excessively (e.g., during sleep). The weight of the user's head may thus cause the user's neck to overextend while placing acute stress on the user's neck muscles and spine. Thus, in some example embodiments, a headrest pillow may include a support element that is coupled with a securing element. The securing element may be configured to secure and/or stabilize the support element in one or more positions that enable the support element to provide adequate support for a user's head, neck, and/or upper spine. For instance, the securing element may be anchored to the user (e.g., the user's hand and/or arm) and/or a seat (e.g., headrest, armrest), thereby providing a counterbalance to the weight of the user's head, neck, and/or upper spine against the support element. A self-securing and stabilizing headrest pillow may mitigate the aforementioned discomfort associated with sitting upright for an extended period of time.

FIG. 1 depicts a perspective view of a headrest pillow 100, in accordance with some example embodiments.

FIG. 2 depicts a front view of the headrest pillow 100, in accordance with some example embodiments.

FIG. 3 depicts a side view of the headrest pillow 100, in accordance with some example embodiments.

Referring to FIGS. 1-3, the headrest pillow 100 may include a support element 110 and a securing element 120. The support element 110 may include a first surface 110a, a second surface 110b, and a third surface 110c. The first surface 110a may be coupled to the second surface 110b along a first perimeter 115a of the second surface 110b. Moreover, the first surface 110a may be coupled to the third surface along a second perimeter 115b of the third surface 110c. As shown in FIGS. 1-3, the securing element 120 may be a loop that couples to the support element 110 by encirling at least a portion of the first surface 110a. For example, the securing element 120 may be affixed to the support element 110 via a detachable coupling (e.g., Velcro, buttons, snap closures, tied, or the like) and/or a non-detachable coupling (e.g., adhesives, stitching, or the like). Alternately and/or additionally, both the support element 110 and the securing element 120 may be constructed from a single continuous piece of material.

In some example embodiments, the support element 110 may be configured to provide a surface for resting the user's head, neck, and/or upper spine. Thus, the support element 110 may be a pillow and/or a cushion formed from any appropriate material including, for example, foam (e.g., memory foam, or the like), natural filler (e.g., feather, down, or the like), and/or synthetic filler (e.g., polyester fibers, or the like). Alternately and/or additionally, the support element 110 may be an inflatable membrane that may be filled, when needed, with a gas, such as air.

In some example embodiments, the securing element 120 may be configured to anchor the support element 110. For instance as shown in FIGS. 1-3, the securing element 120 may be a strap that may be secured (e.g., looped, or the like) to an anchoring object including, for example, the user (e.g., the user's hand and/or arm) and a seat (e.g., armrest, headrest). In doing so, the securing element 120 may stabilize the position of the support element 110, particularly with respect to the user's head, neck, and/or upper spine.

In some example embodiments, the securing element 120 may be adjustable. As such, the headrest pillow 100 may be able to adapt to and/or accommodate the physical characteristics of the user (e.g., height, girth), the size and/or position of the anchoring object (e.g., the user and/or the seat), and/or desired changes in the placement of the support element 120 relative to the user (e.g., the user's head, neck, and/or upper spine). For example, as shown in FIGS. 1-3, the securing element 120 may include a buckle 132 and/or a loop 134, which may be used to adjust a length of the securing element 120. However, it should be appreciated that a variety of mechanisms may be used for rendering the securing element 120 adjustable. For instance, at least a portion of the securing element 120 may be formed from an elastic material.

FIG. 4 depicts an example use of the headrest pillow 100, in accordance with some example embodiments. Referring to FIGS. 1-4, in some example embodiments, the securing element 120 may be secured to a seat 410, for example a headrest 412 of the seat 410, such that the support element 110 is in a position to provide support for a head 422, a neck 424, and/or an upper spine 426 of a user 420. For instance, the securing element 120 may be secured to the seat 410 by at least looping the securing element 120 around the headrest 412. However, it should be appreciated that the securing element 120 may be secured to the seat 410 (e.g., the headrest 412) in any manner.

FIG. 5 depicts an example use of the headrest pillow 100, in accordance with some example embodiments. Referring to FIGS. 1-3 and 5, in some example embodiments, the securing element 120 may be secured to the user 420, for example an arm 432 of the user 420, such that the support element 110 is in a position to provide support for the head 422, the neck 424, and/or the upper spine 426 of the user 420. As shown in FIG. 5, to secure the securing element 120 to the user 420 (e.g., the arm 432), the securing element 120 may be looped around a torso 428 of the user 420. Thus, while the support element 110 is placed on one side of the user 420, the securing element 120 may be secured to the arm 432 on an opposite side of the user 420. Here, the force of the user's arm 432 against the securing element 120 may provide a counterbalance to the weight of the head 422, the neck 424, and/or the upper spine 426 of the user 420 against the support element 110. It should be appreciated that securing element 120 in the manner shown in FIG. 5 (e.g., across the torso 428 of the user 420) may further enhance the stability of the support element 110.

Figure 6:
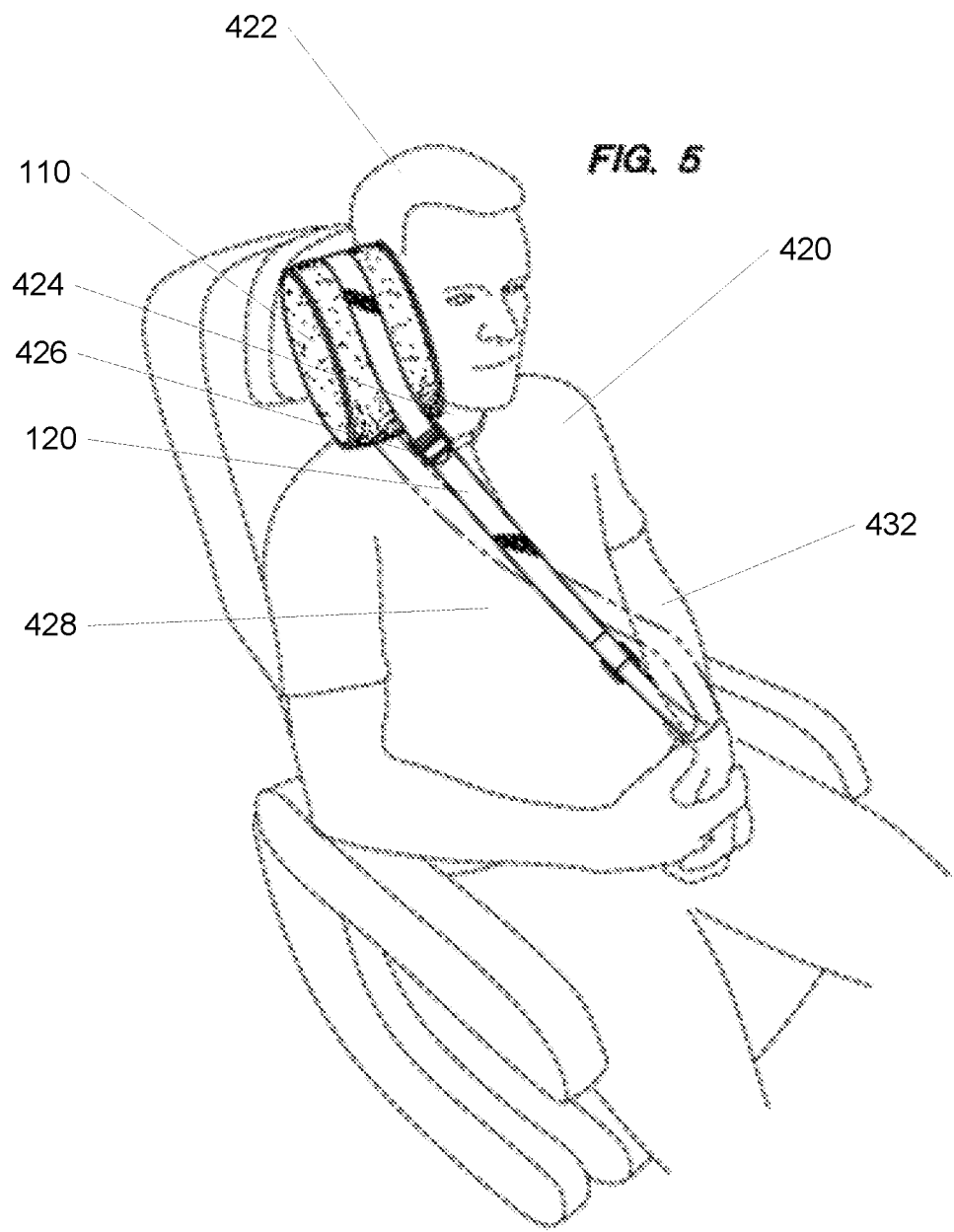
FIG. 6 depicts an example use of a headrest pillow, in accordance with some example embodiments.

FIG. 6 depicts an example use of the headrest pillow 100, in accordance with some example embodiments. Referring to FIGS. 1-3 and 6, in some example embodiments, the securing element 120 may be secured to the user 420, for example a hand 434 of the user 420, such that the support element 110 is in a position to provide support for the head 422, the neck 424, and/or the upper spine 426 of the user 420. As shown in FIG. 6, to secure the securing element 120 to the user 420 (e.g., the hand 434), the securing element 120 may be looped around the torso 428 of the user 420. Thus, while the support element 110 is placed on one side of the user 420, the securing element 120 may be secured to the hand 434 on the same or an opposite side of the user 420.

Here, the force of the user's hand 434 against the securing element 120 may provide a counterbalance to the weight of the head 422, the neck 424, and/or the upper spine 426 of the user 420 against the support element 110. It should be appreciated that securing the securing element 120 in this crisscrossed manner (e.g., across the torso 428 of the user 420) may enhance the stability of the support element 110. Furthermore, although FIG. 6 shows the securing element 120 being secured by a single hand (e.g., the hand 434), it should be appreciated that the user 420 may secure the securing element 120 using one and/or both hands.

FIG. 7 depicts an example use of the headrest pillow 100, in accordance with some example embodiments. In some example embodiments, the securing element 120 may be secured to the user 420 (e.g., the arm 432 of the user 420) and the seat 410 (e.g., an armrest 414 of the seat 410) such that the support element 110 is in a position to provide support for the head 422, the neck 424, and/or the upper spine 426 of the user 420. As shown in FIG. 7, to secure the securing element 120 to the user 420 (e.g., the arm 432), the securing element 120 may be looped around the 414 torso 428 of the user 420. Thus, while the support element 110 is placed on one side of the user 420, the securing element 120 may be secured to the arm 432 and the armrest 414 on an opposite side of the user 420. Here, the force of the arm 432 and/or the armrest 414 against the securing element 120 may provide a counterbalance to the weight of the head 422, the neck 424, and/or the upper spine 426 of the user 420 against the support element 110. Securing the securing element 120 in this crisscrossed manner (e.g., across the torso 428 of the user 420) may further enhance the stability of the support element 110.

FIG. 8 depicts an example use of the headrest pillow 100, in accordance with some example embodiments. Referring to FIGS. 1-3 and 8, in some example embodiments, the securing element 120 may be secured to the seat 410, for example to the armrest 414 of the seat 410, such that the support element 110 is in a position to provide support for the 422 head, the neck 424, and/or the upper spine 426 of the user 420. As shown in FIG. 8, to secure the securing element 120 to the seat 410 (e.g., the armrest 414), the securing element 120 may be looped around the torso 428 of the user 420. Thus, while the support element 110 is on one side of the user 420, the securing element 120 may be secured to the seat 410 (e.g., the armrest 414) on an opposite side of the user 420. The force of the armrest 414 against the securing element 120 may provide a counterbalance to the weight of the head 422, the neck 424, and/or the upper spine 426 of the user 420 against the support element 110. Meanwhile, securing the securing element 120 in this crisscrossed manner (e.g., across the torso 428 of the user 420) may enhance the stability of the support element 110. It should be appreciated that when the headrest pillow 100 is used in this manner, the arm 432 and/or the hand 434 of the user 420 may remain free.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above.

In addition, the steps or logic flow described herein in a certain order does not require the particular order stated or shown, or sequential order, to achieve desirable results. When examples are described, they are to include all types of examples encompassed by the phrases and/or terms used and are not limited to the particular examples mentioned. Other implementations may be within the scope of the following claims.

What is claimed is:

1. An apparatus, comprising:
   a support element having a first surface, a second surface, and a third surface, the first surface coupled to the second surface along a first perimeter of the first surface, and the first surface coupled to the third surface along a second perimeter of the first surface; and
   a securing element, the securing element encircling at least a portion of the first surface of the support element, the securing element configured to be secured to an anchoring object, and the securing of the securing element to the anchoring object maintains the support element in a position that enables the support element to provide support for a head, a neck, and/or an upper spine of a user.

2. The apparatus of claim 1, wherein the securing element comprises a strap.

3. The apparatus of claim 2, wherein the strap comprises a buckle and/or a loop that enables an adjustment of a length of the strap.

4. The apparatus of claim 1, wherein the support element comprises a cushion comprising foam, a natural filler, and/or a synthetic filler.

5. The apparatus of claim 1, wherein the support element comprises an inflatable cushion.

6. The apparatus of claim 1, wherein the securing element is secured to the anchoring object to at least provide a counterbalance to a weight of the head, the neck, and/or the upper spine of the user against the support element.

7. The apparatus of claim 6, wherein the securing element is secured to the anchoring object on an opposite side of the user as the support element.

8. The apparatus of claim 6, wherein the securing element is secured to the anchoring object on a same side of the user as the support element.

9. The apparatus of claim 6, wherein the anchoring object comprises at least a portion of the user.

10. The apparatus of claim 6, wherein the anchoring object comprises a hand and/or an arm of the user.

11. The apparatus of claim 6, wherein the anchoring object comprises at least a portion of a seat.

12. The apparatus of claim 6, wherein the anchoring object comprises a headrest and/or an armrest of the seat.

13. The apparatus of claim 1, wherein the securing element is coupled to the support element via a detachable and/or a non-detachable coupling.

14. A method, comprising:
    securing, to an anchoring object, a securing element, the securing element being coupled to a support element having a first surface, a second surface, and a third surface, the first surface being coupled to the second surface along a first perimeter of the first surface, and the first surface being coupled to the third surface along a second perimeter of the first surface, the securing element encircling at least a portion of the first surface of the support element, and the securing of the securing element to the anchoring object maintains the support element in a position that enables the support element to provide support for a head, a neck, and/or an upper spine of a user.

15. The method of claim 14, wherein the anchoring object comprises at least a portion of the user.

16. The method of claim 14, wherein the anchoring object comprises at least a portion of a seat.

17. The method of claim 11, wherein the securing of the securing element comprises looping the securing element around a torso of the user.

18. The method of claim 17, wherein the securing element is looped around the torso of the user to at least enable the securing element to be secured to the anchoring object on a same and/or an opposite side of the user as the cushion element.

19. The method of claim 14, wherein the securing element is secured to the anchoring object to at least provide a counterbalance to a weight of the head, the neck, and/or the upper spine of the user against the support element.

20. An apparatus, comprising:
   a cushion having a first surface, a second surface, and a third surface, the first surface coupled to the second surface along a first perimeter of the first surface, and the first surface coupled to the third surface along a second perimeter of the first surface; and
   a strap, the strap encircling at least a portion of the first surface of the cushion, the strap configured to be secured to an anchoring object, and the securing of the strap to the anchoring object maintains the cushion in a position that enables the cushion to provide support for a head, a neck, and/or an upper spine of a user.

* * * * *